(12) United States Patent
Kuramoto

(10) Patent No.: US 7,546,969 B2
(45) Date of Patent: Jun. 16, 2009

(54) SYSTEMS AND METHODS OF WINDING A PORTABLE CORD

(75) Inventor: Yoshisuke Kuramoto, 10-15, Shinmachi 3-chome, Kokubunji-shi (JP) 185-0004

(73) Assignee: Yoshisuke Kuramoto, Kokubunji-shi, Tokyo ( * ) Notice: Subject to any disclaimer, the term of this patent is extended or adjusted under 35 U.S.C. 154(b) by 0 days.

(21) Appl. No.: 11/495,909

(22) Filed: Jul. 31, 2006

(65) Prior Publication Data
US 2007/0108333 A1    May 17, 2007

(30) Foreign Application Priority Data
Nov. 15, 2005    (JP) .................... 2005-010514 U
Feb. 20, 2006    (JP) .................... 2006-001904 U

(51) Int. Cl.
*B65H 75/38* (2006.01)
(52) U.S. Cl. .............. 242/388.1; 242/388.2; 242/118.2; 242/118.4; 242/579
(58) Field of Classification Search .............. 242/379.2, 242/388.1–388.2, 579, 580, 587, 587.2, 118.2, 242/118.4
See application file for complete search history.

(56) References Cited

U.S. PATENT DOCUMENTS 3,208,121 A * 9/1965 Price .................... 242/388.1
4,390,142 A * 6/1983 Cheng .................... 242/388.1
4,802,638 A * 2/1989 Burger et al. ............ 242/388.1

FOREIGN PATENT DOCUMENTS

JP        06171836 A  *  6/1994

* cited by examiner

Primary Examiner—Sang Kim

(57) ABSTRACT

A miniature cord reel device comprising latch mechanism, where the latch mechanism is realized with a top flange, a bottom flange, attached on both ends of a core, a rotating sleeve, two projections on both sides of the cutout on the sleeve, a groove with groove notches on the top flange and the bottom flange.

8 Claims, 3 Drawing Sheets

SYSTEMS AND METHODS OF WINDING A PORTABLE CORD

CROSS-REFERENCE TO RELATED APPLICATIONS

Japan Utility Model (Registered) 3119484

STATEMENT REGARDING FEDERALLY SPONSORED RESEARCH OR DEVELOPMENT

Not Applicable

REFERENCE TO MATERIAL SUBMITTED SEPARATELY

Not Applicable

BACKGROUND OF THE INVENTION

Some cord reels are designed for use with headphone or mouse cables, AC adapter cords, or any such device that uses such cords. For example, Japanese Patent (Published) No. Heisei 11-246126 and Japanese Patent (Published) No. 2001-292218 describe a take-up system wherein the cord is inserted into the groove of a shaft attached to the center of a round casing or cover and then the shaft is wound to take up the cord. These systems can be downsized but the cord detaches from the cord reel or slips off the reel at the attachment point when the cord is extended.

A device that uses a take-up system that anchors and winds the cord around a round base plate between the top and bottom halves of a split casing is already in commercial use. In such a system the two cross-section areas are smaller because the take-up housing is divided and if the mechanism is downsized cord winding becomes less efficient due to the increase in the resistance to winding, making the mechanism more difficult to operate. With stereo headphones the cord is much thicker where the cords of the left and right headphones converge with the main trunk of the cord. With some stereo headphones the cords of the left and right headphones are not the same length. If the aforementioned system is downsized, the aperture that admits the cord becomes very small, so the junction where the cords of the left and right headphones converge will jam the aperture and winding will stop. Even if the cord aperture is enlarged, if the left and right cords are of different lengths the device will take up the cords only as far as the end of the short cord and the end of the long cord will remain hanging free.

A miniature light-weight cord reel equipped with a latch mechanism that allows attaching the center of any type of cord for a headphone or earpieces for mobile telephones and portable sound devices regardless of cord thickness or weight, affords greater operability and better take-up efficiency, allows winding past the point where left and right cords converge, and allows winding of left and right cords of different lengths has not yet been invented.

BRIEF SUMMARY OF THE INVENTION

Purpose

This invention is a miniature cord reel that can be set to wind a cord of any length to take up and store the cord of a headphone or earpieces of a mobile telephone, portable sound device, or any device that uses such detachable cords, by attaching the hook of the take-up reel to the middle of the detached cord at the point where the left/right headphones diverge.

METHOD

The cord reel comprises a bobbin with a hook (4) on its core (3) that catches the cord and a partial cutout on a sleeve (2) (FIGS. 1 and 2). The rotation of the sleeve (2) with the cord hitched to the hook (4) takes up the cord (FIGS. 3 and 4). If the lengths of the cords are not the same, the remaining length of the longer cord that cannot be wound up completely wraps around the outside of the sleeve (2) and is fastened with the clip (11) (FIG. 5). The sleeve (2) rotates along the groove (8) of the top flange (1) and the bottom flange (5). There are notches (9) of fixed width on the outer rim of the groove where the sleeve projection (10) is pinched to lock the sleeve (2) (FIG. 6A). The lock is released by pushing inward on the sleeve projection (FIG. 6B).

DETAILED DESCRIPTION OF THE INVENTION

Problem to Be Solved

The invention eliminates interference during take-up and storage of a cord for any type of headphone or earpiece of a mobile telephone or portable sound device where said cord diverges at one point to the left and right earpiece, or where the left and right halves of said cord are not the same length; the aforementioned interference occurs when winding stops at the point where the left and right cords join, or stops immediately after the shorter of the two cords has wound completely.

If the shape of the cord reel that takes up and stores the cord is very large, the cord must be always taken off the reel before the cord can be connected so the headphones or earpieces can be used. The length of the cord cannot be adjusted, so there is the danger of the cord catching and breaking if the cord reel is turned when it is removed. To prevent this, the cord reel is miniaturized so it can always be attached to the cord and adjusted for the cord length.

The invention employs a latch that prevents the cord from uncoiling accidentally to an undesirable length from the reel during length adjustment while the cord is being reeled out or reeled in for storage.

If a cord is wound accidentally as far as a jack, earpiece, miniature microphone or other such device attached to the end of the cord, this could prevent the cord from unwinding and damage the cord if excessive force is applied to pull it off the reel. For this reason this invention allows the cord to be unwound easily even after the cord has been accidentally wound as far as a device attached to the end of the cord.

Means to Solve the Problem

Figure 1:
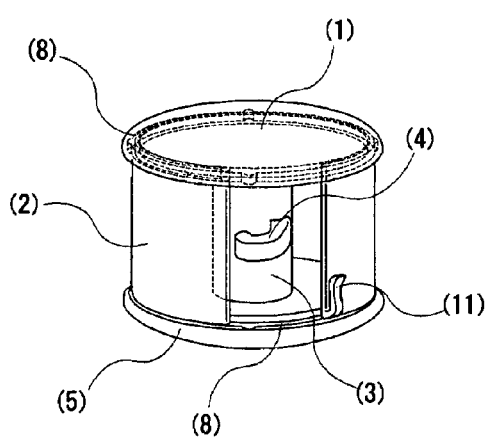
FIG. 1: Perspective View
(1) Top Flange
(2) Sleeve
(3) Core
(4) Hook
(5) Bottom Flange
(6) Hole
(7) Projection
(8) Groove
(9) Groove Notch
(10) Sleeve Projection
(11) Clip
Figure 2:
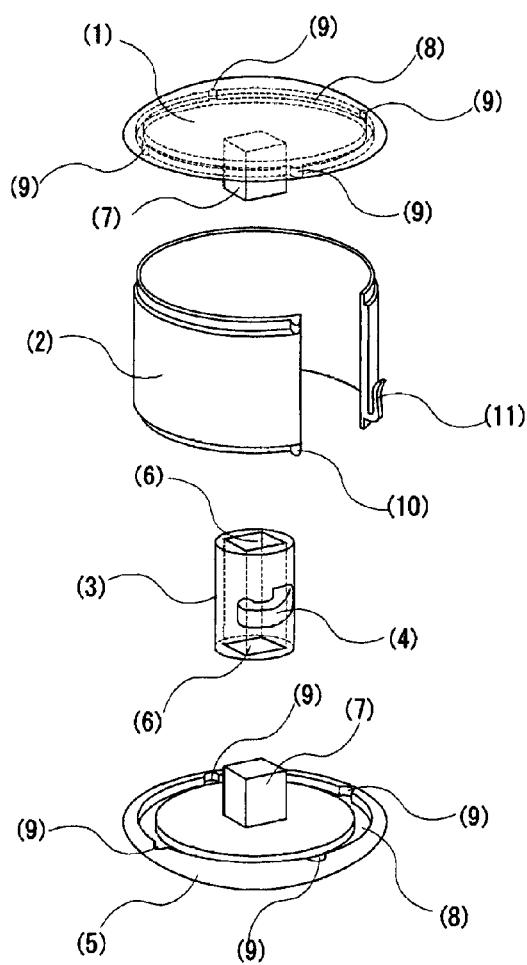
FIG. 2: Exploded Perspective View

The miniature cord reel device comprises a top flange (1) and a bottom flange (5), freely attached and removed at both ends of a core (3) to prevent the cord from unraveling, a hook (4) attached to the core (3) to anchor the cord, grooves (8) on the top and bottom flanges that allow the cord to move along the grooves (8), and a latch function consisting of a cutout on the sleeve (2) (FIGS. 1 and 2).

EFFICACY OF THE INVENTION

The implementation of this invention allows attachment of the cord at the junction where the left and right cords join the trunk so adjustment can be done for the different lengths of the left and right cords during take-up and storage of the cord of a headphone or earpieces of a mobile telephone or portable sound device. The invention eliminates twisting and tangling and prevents damage to the cord when it is reeled out for use of the mobile device. As the cord reel remains always attached to the cord, this also prevents mislaying the cord reel when the mobile device is not being used.

IMPLEMENTATION OF THE INVENTION

Examples

Figure 5:
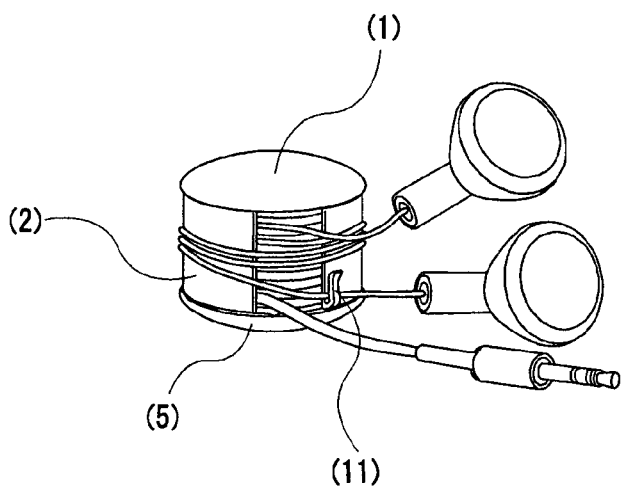
FIG. 5: Cord that cannot be wound completely is wound around the sleeve exterior and fastened with the clip (11)

This cord reel mechanism comprises the projection (7) of the top flange (1) and the bottom flange (5) inserted into the holes (6) on each end of the core (3) equipped with a hook (4), the bobbin, and the partial cutout on the sleeve (2) (FIGS. 1 and 2). The cutout of the sleeve (2) comprises the take-up aperture and is wide enough to allow the cord to pass through even after the thickness of the cord swells at the point where the left and right cords join so the cord can wind up completely. Also, if the left and right cords of the stereo headphones, etc. are not the same length, the longer cord which cannot be wound up with the shorter cord winds around the exterior of the sleeve and catches on the clip (11) where it is held in place (FIG. 5).

The cord reel take-up mechanism, comprised of the core (3) and sleeve (2) sandwiched between the top flange (1) and the bottom flange (5), and the storage mechanism comprised of the top flange (1) and the bottom flange (5), sleeve (2), and core (3) enclosed by the wrapped cord, is very simple (no partition is required) so this increases the overall efficiency and makes this configuration easy to downsize and construct with light materials.

Figure 3:
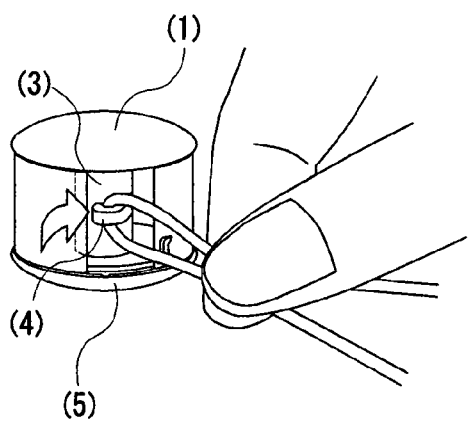
FIG. 3: Attaching the center of the cable to the hook
Figure 4:
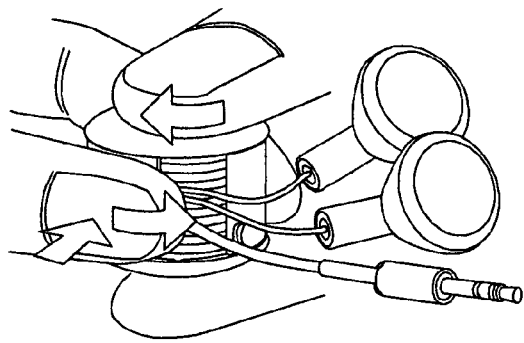
FIG. 4: Pinching the sleeve, rotating the flange, winding up the cord
Figure 6:
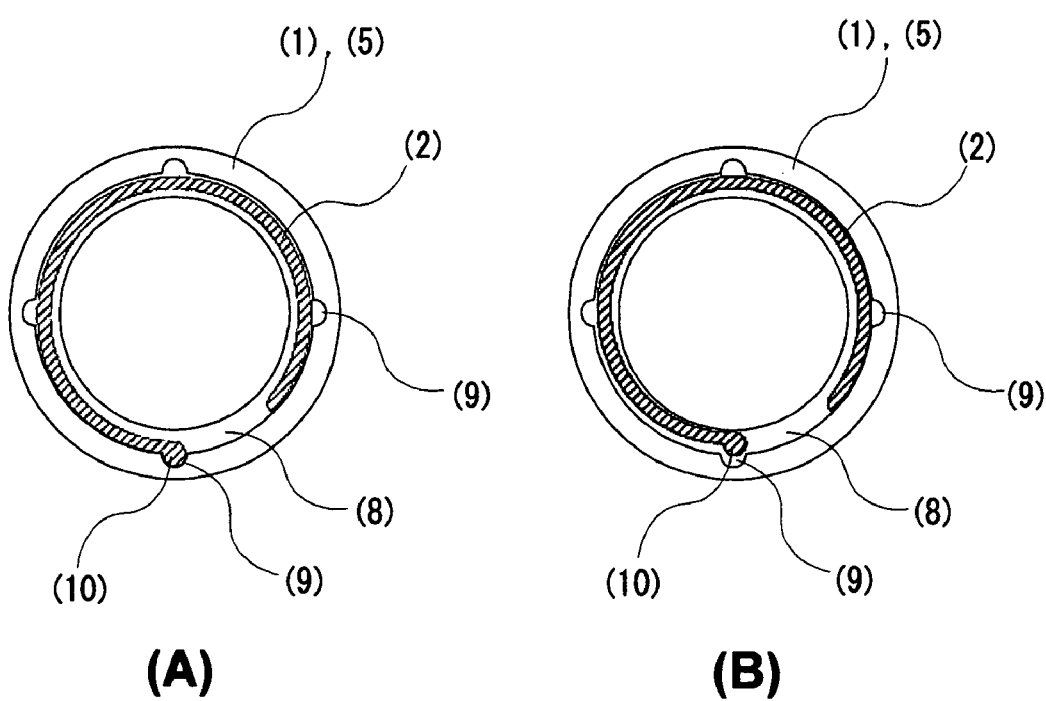
FIG. 6: Latch Mechanism and Cord Take-up
A: Lock mechanism
B: Unlocked (sleeve pinched)

The sleeve (2) fits into the grooves (8) of the top flange (1) and the bottom flange (5). Notches (9) of fixed width are cut in the outer circumference of the groove (8) of inward surfaces of the top flange (1) and the bottom flange (5). On both sides of the cutout on the sleeve (2), two sleeve projections are channeled in the grooves (8) (FIG. 1). These notches (9) and sleeve projections comprise the latch mechanism. When a sleeve projection (10) slots into a flange notch (9), this locks the rotation of the sleeve (2) (FIG. 6A). Pinching the sleeve projection (10) with the tip of the finger removes the sleeve projection (10) from the groove notch (9), releases the lock, and allows the sleeve (2) to rotate freely (FIG. 6B). The middle of the cord to be wound up is attached to the hook (4) of the core (3) (FIG. 3), the sleeve (2) is pinched, then the sleeve (2) is rotated to wind up the cord (FIG. 4). When the cord is pulled out, the sleeve projection (10) is pinched so the cord can be pulled out and extended. When the tip of the finger pinching the sleeve (2) is released, the sleeve projection (10) falls into the notch (9) of the nearest groove (8), locks the mechanism, and the cord maintains the extended length (FIG. 6A).

Because the top flange (1) and the bottom flange (5) are only inserted into the hole (6) of the core (3) if the user accidentally winds the cord as far as the end of the cord where a jack or earpiece of a mobile phone or other device is attached, the top flange and the bottom flange (5) disconnects from the core (3) so the cord can be pulled out.

The invention claimed is:

1. A miniature cord reel device comprising a latch mechanism, wherein the latch mechanism includes a top flange, a bottom flange, the flanges attached on both ends of a core, a rotating sleeve with a cutout, a projection on the sleeve, each flange having a groove with groove notches; and the rotation of the sleeve locks when the sleeve projection on the sleeve is channeled into the groove of the bottom flange and fits into the notches of the bottom flange, and the sleeve projection is released from the respective notch by pinching the sleeve near the sleeve projection with a tip of finger, which unlocks the latch mechanism allowing the sleeve to rotate free.

2. A miniature cord reel device comprising:
a core having a first end and a second end;
a first flange attached to the first end of the core;
a second flange attached to the second end of the core; and
a sleeve with a cutout, the sleeve being selectively engaged with the first flange to prevent the first flange from rotating relative to the sleeve, or disengaged from the first flange to allow the first flange to rotate relative to the sleeve, wherein the first flange defines a groove having a groove notch, and the sleeve defines a projection in the groove.

3. A miniature cord reel device comprising:
a core having a first end and a second end;
a first flange attached to the first end of the core;
a second flange attached to the second end of the core; and
a sleeve with a cutout, the sleeve being selectively engaged with the first flange to prevent the first flange from rotating relative to the sleeve, or disengaged from the first flange to allow the first flange to rotate relative to the sleeve, wherein the first flange defines a continuous groove having a groove notch, and the sleeve defines a projection in the groove, to allow the first flange to rotate more than 360 degrees relative to the sleeve.

4. A miniature cord reel device comprising:
a core having a first end and a second end;
a first flange attached to the first end of the core;
a second flange attached to the second end of the core; and
a sleeve with a cutout, the sleeve being selectively engaged with the first flange to prevent the first flange from rotating relative to the sleeve, or disengaged from the first flange to allow the first flange to rotate relative to the sleeve, wherein the first flange defines a groove having a groove notch, and the sleeve defines a projection in the groove and selectively engageable with the groove notch, wherein the projection is disengageable from the groove notch by pinching the sleeve.

5. A method of winding a detachable cord of a portable sound device, the method operating with a core having a first end and a second end, a first flange attached to the first end of the core, a second flange attached to the second end of the core, and a sleeve, the method comprising:
- attaching a midpoint of the cord to the core;
- holding the sleeve, using a first hand;
- rotating the core relative to the sleeve by rotating the first and second flanges, using a second hand; and
- subsequently, engaging the sleeve with the first flange to prevent the core from rotating relative to the sleeve.

6. The method of claim 5 wherein the first flange defines a groove having a groove notch, the sleeve defines a projection in the groove, and engaging includes engaging the projection with the groove notch.

7. The method of claim 5 wherein the step of attaching includes attaching where left and right parts of the cord diverge.

8. A device for winding a detachable cord of a portable sound device, the device comprising:
- a core having a first end and a second end;
- a first flange attached to the first end of the core;
- a second flange attached to the second end of the core;
- a sleeve;
- means for attaching a midpoint of the cord to the core;
- means for rotating the core relative to the sleeve; and
- means for engaging the sleeve with the first flange to prevent the core from rotating relative to the sleeve.

* * * * *